(12) United States Patent
Tang et al.

(10) Patent No.: US 10,965,178 B2
(45) Date of Patent: Mar. 30, 2021

(54) HAIRPIN WINDING ELECTRIC MACHINE

(71) Applicant: Ford Global Technologies, LLC, Dearborn, MI (US)

(72) Inventors: Chun Tang, Canton, MI (US); Adeeb Ahmed, Canton, MI (US); Kyi Shin Shiah, Northville, MI (US); Jacob Krizan, Farmington Hills, MI (US); Joel Hetrick, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 148 days.

(21) Appl. No.: 16/202,554

(22) Filed: Nov. 28, 2018

(65) Prior Publication Data

US 2020/0169137 A1 May 28, 2020

(51) Int. Cl.
*H02K 3/28* (2006.01)
*H02K 3/50* (2006.01)
*H02K 3/14* (2006.01)
*H02K 1/16* (2006.01)

(52) U.S. Cl.
CPC .................. *H02K 3/28* (2013.01); *H02K 1/16* (2013.01); *H02K 3/14* (2013.01); *H02K 3/50* (2013.01)

(58) Field of Classification Search
CPC .. H02K 3/28; H02K 1/16; H02K 3/14; H02K 3/50
USPC .................................. 310/179, 180, 184, 195
See application file for complete search history.

(56) References Cited

U.S. PATENT DOCUMENTS

| | | | |
|---|---|---|---|
| 7,034,428 B2 | 4/2006 | Cai et al. | |
| 2008/0042508 A1* | 2/2008 | Cai | H02K 3/28 310/198 |
| 2009/0140596 A1 | 6/2009 | Kaiser et al. | |
| 2016/0322878 A1* | 11/2016 | Tokumasu | H02K 3/28 |

FOREIGN PATENT DOCUMENTS

| | | |
|---|---|---|
| CN | 207265748 U | 4/2018 |
| WO | WO2018141492 A1 | 8/2018 |

* cited by examiner

*Primary Examiner* — Thomas Truong
(74) *Attorney, Agent, or Firm* — David B. Kelley; Brooks Kushman P.C.

(57) ABSTRACT

An electric machine includes a stator core defining slots and a hairpin winding path disposed in the slots. The winding path includes first and second hairpins having legs with same slot spans and twist with same slot spans. The hairpins are installed in the core such that one of the twists of the first hairpin crisscrosses with one of the twists of the second hairpin. A reverse jumper joins the twists that crisscross.

16 Claims, 9 Drawing Sheets

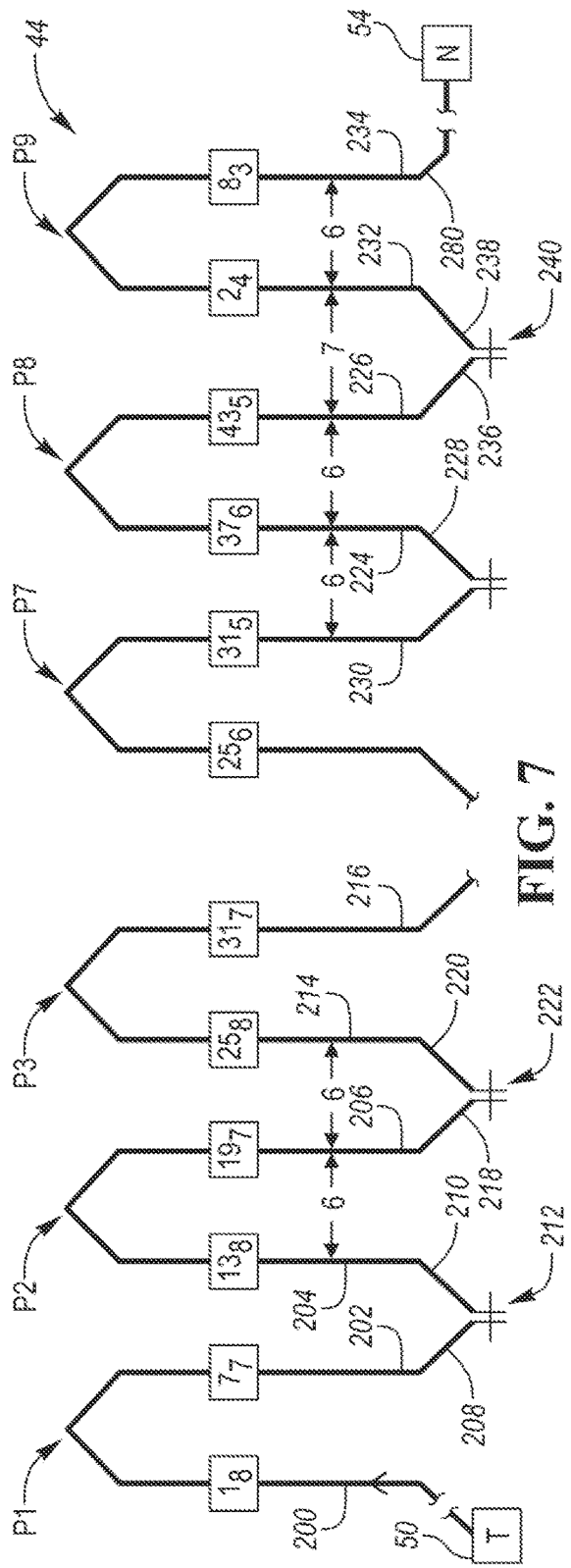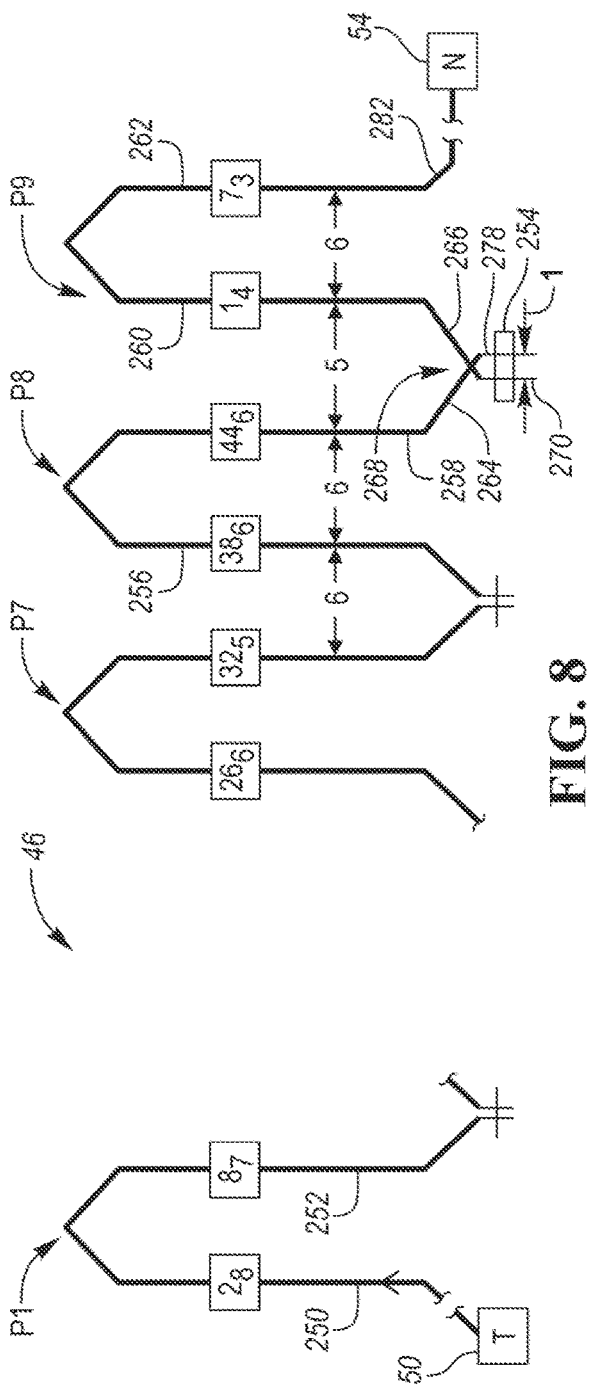

HAIRPIN WINDING ELECTRIC MACHINE

TECHNICAL FIELD

The present disclosure relates to electric machines and more specifically to electric machines that include hairpin windings.

BACKGROUND

Vehicles such as battery-electric vehicles and hybrid-electric vehicles contain a traction-battery assembly to act as an energy source for the vehicle. The traction battery may include components and systems to assist in managing vehicle performance and operations. The traction battery may also include high-voltage components, and an air or liquid thermal-management system to control the temperature of the battery. The traction battery is electrically connected to an electric machine that provides torque to driven wheels. Electric machines typically include a stator and a rotor that cooperate to convert electrical energy into mechanical motion or vice versa.

SUMMARY

According to one embodiment, an electric machine includes a stator core defining slots and a hairpin winding path disposed in the slots. The winding path includes first and second hairpins having legs with same slot spans and twists with same slot spans. The hairpins are installed in the core such that one of the twists of the first hairpin crisscrosses with one of the twists of the second hairpin. A reverse jumper joins the twists that crisscross.

According to another embodiment, an electric machine includes a stator core defining circumferentially arranged slots and a first hairpin winding path of a first phase of the electric machine disposed in the slots. The first hairpin winding path includes first and second hairpins each having a leading leg and a trailing leg that are spaced apart by a slot span of X. Each of the legs are bent to have a twist with a slot span of X divided by two. The first and second hairpins are installed in corresponding ones of the slots such that a slot span between the leading leg of the first hairpin and the trailing leg of the second hairpin is equal to X minus one and the twist of the leading leg of the first hairpin and the twist of the trailing leg of the second hairpin crisscross. A reverse jumper joins the twist of the leading leg of the first hairpin to the twist of the trailing leg of the second hairpin.

According to yet another embodiment, an electric machine includes a stator core defining slots, and a hairpin winding path including a first section of interconnected first hairpins having legs disposed in even ones of the slots and a second section of interconnected second hairpins having legs disposed in odd ones of the slots. A reverse jumper joins a last one of the first hairpins to an initial one of the second hairpins. The jumper defines a leading end connected to the last one of the first hairpins and a trailing end connected to the initial one of the second hairpins.

BRIEF DESCRIPTION OF THE DRAWINGS

FIG. 7 is a diagrammatical view of select hairpins of a first path of the U phase.
FIG. 8 is a diagrammatical view of select hairpins of a second path of the U phase.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
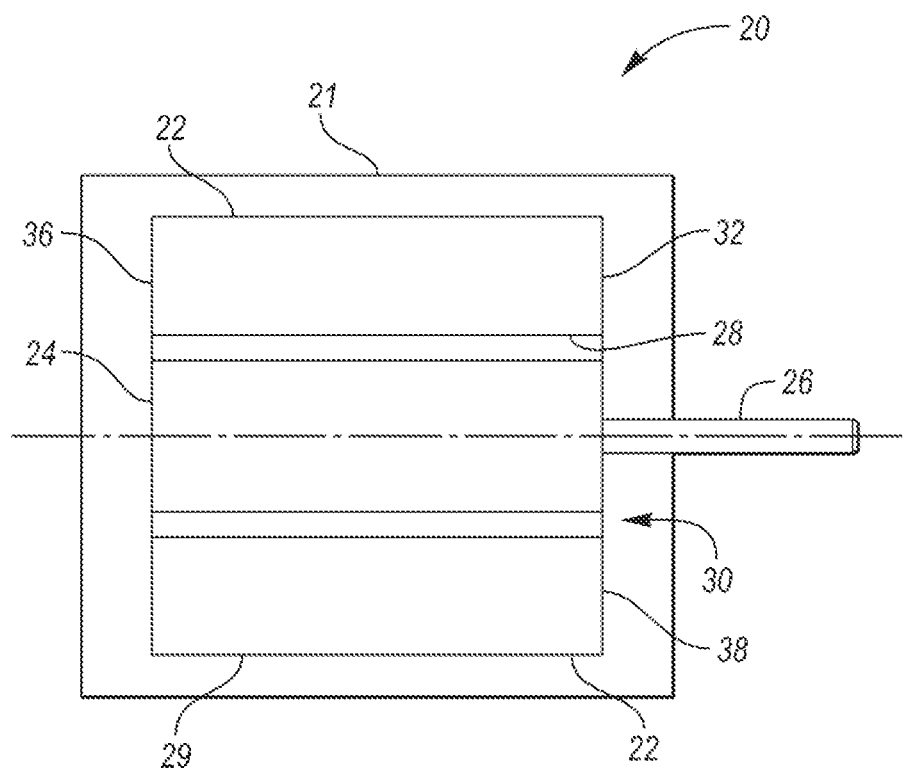
FIG. 1 is a schematic diagram of an electric machine.

Referring to FIG. 1, an electric machine 20 may be used in a vehicle such as a fully electric vehicle or a hybrid-electric vehicle. The electric machine 20 may be referred to as an electric motor, a traction motor, a generator, or the like. The electric machine 20 may be a permanent magnet machine, an induction machine, or the like. In the illustrated embodiment, the electric machine 20 is a three-phase alternating current (AC) machine. The electric machine 20 is capable of acting as both a motor to propel the vehicle and as a generator such as during regenerative braking.

The electric machine 20 may be powered by a traction battery of the vehicle. The traction battery may provide a high-voltage direct current (DC) output from one or more battery-cell arrays, sometimes referred to as battery-cell stacks, within the traction battery. The battery-cell arrays may include one or more battery cells that convert stored chemical energy to electrical energy. The cells may include a housing, a positive electrode (cathode), and a negative electrode (anode). An electrolyte allows ions to move between the anode and cathode during discharge, and then return during recharge. Terminals allow current to flow out of the cells for use by the vehicle.

The traction battery may be electrically connected to one or more power electronics modules. The power electronics modules may be electrically connected to the electric machines 20 and may provide the ability to bi-directionally transfer electrical energy between the traction battery and the electric machine 20. For example, a typical traction battery may provide a DC voltage while the electric machine 20 may require a three-phase (AC) voltage. The power electronics module may include an inverter that converts the DC voltage to a three-phase AC voltage as required by the electric machine 20. In a regenerative mode, the power electronics module may convert the three-phase AC voltage from the electric machine 20 acting as a generator to the DC voltage required by the traction battery.

Figure 2:
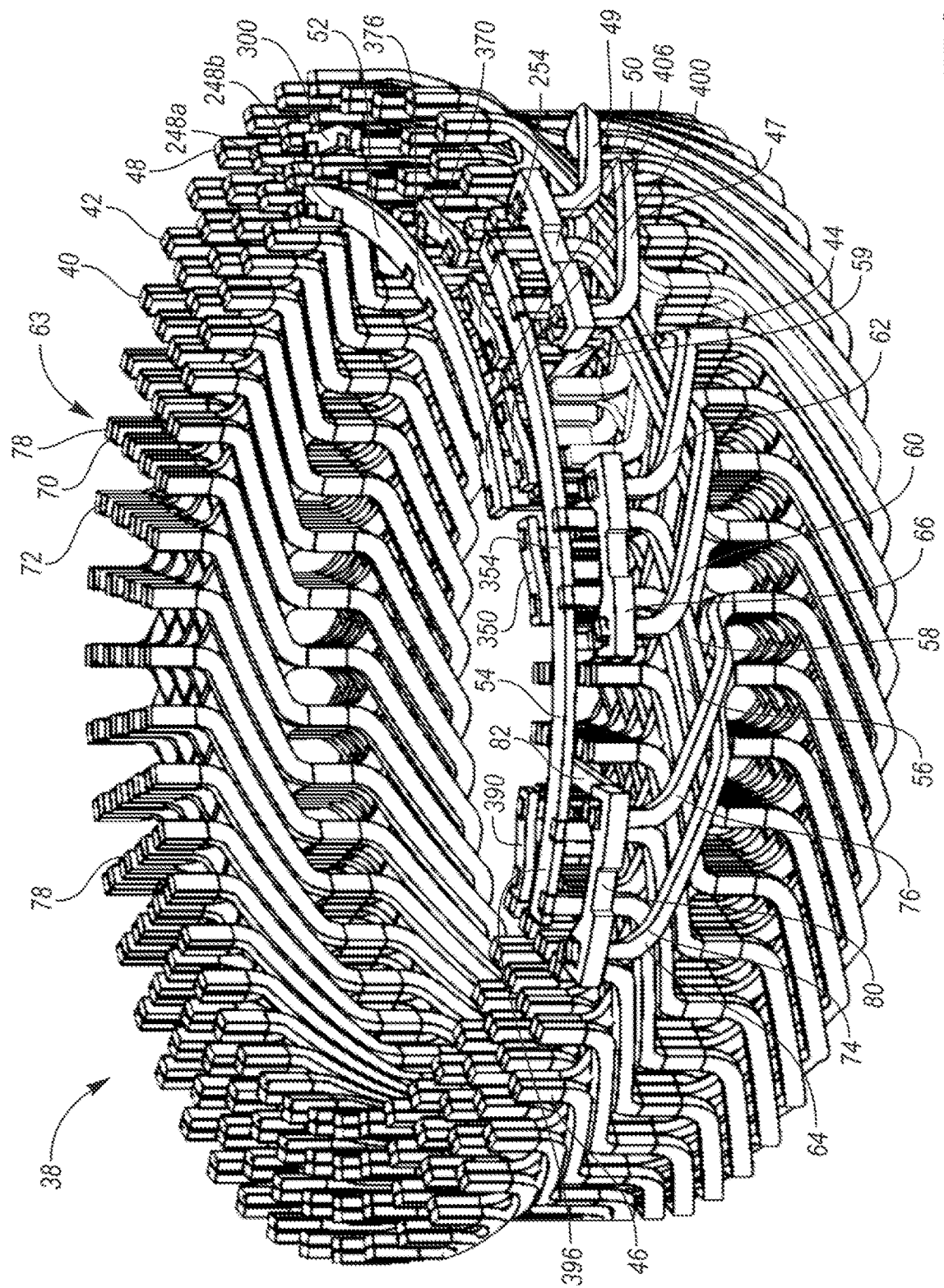
FIG. 2 is a diagrammatical perspective view of a winding of the electric machine with legs of the hairpins substantially shortened for illustrative purposes.

Referring to FIGS. 1 and 2, the electric machine 20 includes a housing 21 that encloses the stator 22 and the rotor 24. The stator 22 is fixed to the housing 21 and includes a cylindrical core 32 having an inner diameter 28 that defines a hole 30 and an outer diameter 29. The core 32 may be formed from a plurality of stacked laminations. The rotor 24 is supported for rotation within the hole 30. The rotor 24 may include windings or permanent magnets that interact with windings of the stator 22 to generate rotation of the rotor 24 when the electric machine 20 is energized. The rotor 24 may be supported on a driveshaft 26 that extends through the housing 21. The driveshaft 26 is configured to couple with a drivetrain of the vehicle.

The stator core 32 defines slots 34 (see FIG. 4) circumferentially arranged around the core 32 and extending outward from the inner diameter 28. The slots 34 may be equally spaced around the circumference and extend axially from a first end 36 of the core 32 to a second end 38. In the illustrated embodiment, the core 32 defines forty-eight slots and has eight poles, but the core 32 may include more or fewer slots and/or poles in other embodiments. For example, the core 32 may define seventy-two slots and have eight poles.

The slots 34 are spaced by a circumferential distance measured between the center lines of two adjacent slots. This distance can be used as a unit of distance (hereinafter "a slot") for relating and measuring other components of the stator 22. The distance unit "slot" is sometimes referred to as "slot pitch" or "slot span."

The electric machine 20 may include hairpin windings 40 placed in the slots 34 of the core 32. Hairpin windings are an emerging technology that improves efficiency for electric machines used in vehicles. The hairpin windings 40 improve efficiency by providing a greater amount of stator conductors to reduce resistance of the winding 40 without encroaching into space reserved for the electrical steel and the magnetic flux path. The hairpin windings 40 may be wave windings in which the windings 40 weave pole to pole in a wave-like pattern.

One challenge with hairpin winding is matching the electric machine design to the desired torque-speed curve. An essential step in designing an electric machine is selecting the phase turn number so that the torque-speed curve covers all required operating points. For conventional stranded windings made of long wires connected in parallel, the desired phase turn number is selected by choosing the number of turns per coil, the number of parallel paths, the number of poles, the number of slots per pole, and the number of layers. While all these factors are also available for hairpin windings, the limiting factors are very different resulting in fewer feasible choices.

For example, while the possible number of poles, slots per pole, and layers are identical between the two technologies, it is not practical in a hairpin winding to have as many turns per coil as in a stranded winding. Each hairpin needs to be connected to the next hairpin by welding, soldering or the like, and needs to be bent according to a specific shape in order to make the connection possible. This limits the number and size of the conductors that can be fit in a single slot. Another challenge is creating parallel circuits that are balanced (i.e., not causing large circulating currents in the loop formed by the parallel circuits due do dissymmetry) and have reasonably complex connections.

The electric machine 20 solves these and other problems. The electric machine 20 may be a three-phase machine in which the hairpin windings 40 are arranged in a U phase, a V phase, and a W phase. Each phase includes associated hairpins conductors (also known as pins, hairpins, or bar conductors) arranged in four parallel paths of windings in the illustrated embodiment. Each phase may include more or less parallel paths in other embodiments.

The hairpins are generally U-shaped and include a pair of legs joined by a crown. The hairpins are installed in the stator core 32 by inserting the legs through corresponding ones of the slots 34. All of the hairpins may be installed from the same end of the stator core 32, e.g., end 36, so that all of the vertices are located on one end of the stator, e.g., end 36, and the ends of the legs are located on the other end, e.g., end 38. Once installed, the legs of the hairpins are bent away from each other to from twists that connect with the twists of other hairpins. The ends of corresponding hairpins are joined by a connection such as a weld 48. The connections may be arranged in rows such as weld rows 63. End 36 may be referred to as the vertex end and end 38 may be referred to as the weld end.

The U phase may include a first path 44, a second path 46, a third path 47, and a fourth path 49. The paths are formed by a plurality of interconnected pins 42. Each of the paths includes a first end that starts at the U-phase terminal 50 and a second end that ends to a neutral connection. In the illustrated embodiment, the electric machine 20 includes an inboard neutral connection 52 and an outboard neutral connection 54. The first and second paths 44, 46 connect to the inboard neutral connection 52, and the third and fourth paths 47, 49 connect to the outboard neutral connection 54. The paths 44, 46, 47, 49 are connected to each other at the terminal 50, which is located near the outer diameter (OD) 29 of the stator core.

The first and second paths 44, 46 start near the inner diameter (ID) 28 of the stator core and have extended terminal leads 59 to connect to the terminal 50. The terminal leads 59 extend radially through adjacent weld rows 63 to thread through the windings 40 to connect with the terminal 50. The first and second paths 44, 46 wind in the counterclockwise direction (when looking at end 38) through the slots 34 and end near the OD 29 at the outboard neutral connection 54. The first and second paths 44, 46 may wind around the stator core approximately four times. The third and fourth paths 47, 49 start near the OD 29 of the stator core and wind in the clockwise direction through the slots 34. The third and fourth paths 47, 49 may wind around the stator core approximately four times and end near the ID 28 at the inboard neutral connection 52. In the illustrated embodiment, each of the paths includes sixteen pins that are interconnected end-to-end to form a continuous conductor between the terminal 50 and the neutral connection 52 or 54.

The V phase may include a first path 56, a second path 58, a third path 60, and a fourth path 62. The paths are formed by a plurality of interconnected pins 64. Each of the paths includes a first end that starts at the V-phase terminal 66 and a second end that ends at neutral connection 52 or 54. The first and second paths 56, 58 connect to the inboard neutral connection 52, and the third and fourth paths 60, 62 connect to the outboard neutral connection 54. The paths 56, 58, 60, 62 are connected to each other at the terminal 66, which is located near the OD 29 of the stator core.

The first and second paths 56, 58 start near the ID 28 of the stator core and have extended terminal leads (not visible) to connect to the terminal 50. The terminal leads extend radially through adjacent weld rows 63 to thread through the windings 40 to connect with the terminal 66. The first and second paths 56, 58 wind in the counterclockwise direction through the slots 34 and end near the OD 29 at the outboard neutral connection 54. The first and second paths 56, 58 may wind around the stator core approximately four times. The third and fourth paths 60, 62 start near the OD 29 of the stator core and wind in the clockwise direction through the slots 34. The third and fourth paths 60, 62 may wind around the stator core approximately four times and end near the ID 28 at the inboard neutral connection 52. In the illustrated embodiment, each of the paths includes sixteen pins that are interconnected end-to-end to form a continuous conductor between the terminal 66 and the neutral connection 52 or 54.

The W phase may include a first path 70, a second path 72, a third path 74, and a fourth path 76. The paths are formed by a plurality of interconnected pins 78. Each of the paths includes a first end that starts at the W-phase terminal 80 and a second end that ends at neutral connection 52 or 54. The first and second paths 70, 72 connect to the inboard neutral connection 52, and the third and fourth paths 74, 76 connect to the outboard neutral connection 54. The paths 70, 72, 74, 76 are connected to each other at the terminal 80, which is located near the OD 29 of the stator core.

The first and second paths 70, 72 start near the ID 28 of the stator core and have extended terminal leads 82 to connect to the terminal 80. The terminal leads 82 extend radially through adjacent weld rows 63 to thread through the windings 40 to connect with the terminal 80. The first and second paths 70, 72 wind in the counterclockwise direction through the slots 34 and end near the OD 29 at the outboard neutral connection 54. The first and second paths 70, 72 may wind around the stator core approximately four times. The third and fourth paths 74, 76 start near the OD 29 of the stator core and wind in the clockwise direction through the slots 34. The third and fourth paths 74, 76 may wind around the stator core approximately four times and end near the ID 28 at the inboard neutral connection 52. In the illustrated embodiment, each of the paths includes sixteen pins that are interconnected end-to-end to form a continuous conductor between the terminal 50 and the neutral connections 52 or 54. The terminals 50, 66, and 80 may include additional leads to connect to the inverter and receive voltage from the inverter, which creates torque-producing current in the winding paths causing the rotor 24 to rotate within the stator 22.

Figure 3:
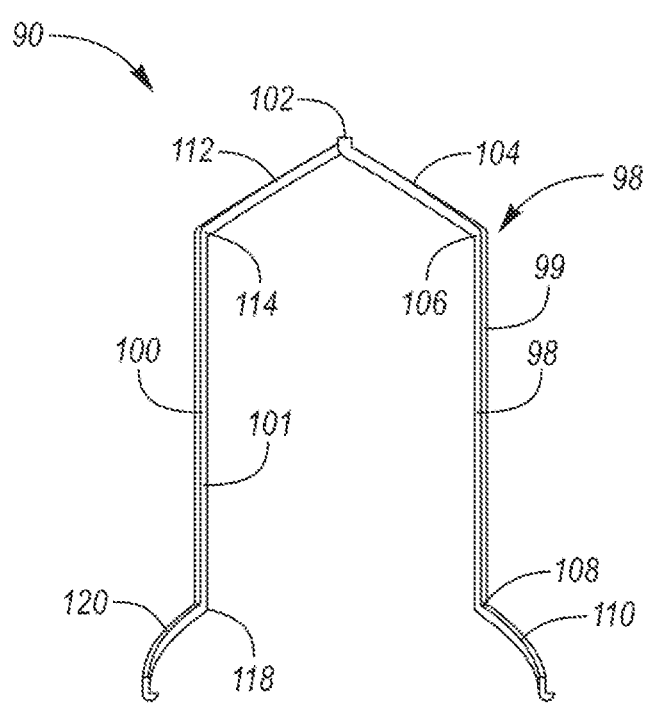
FIG. 3 is a front view of a regular hairpin.

Referring to FIG. 3, the hairpins of each of the paths may include one or more types of pin such as a regular pin 90. Different types of hairpins may differ in shape or size. The regular pins 90 may include a first leg 98 joined to a second leg 100 at a vertex 102. The vertex 102 may radially offset the legs to place the legs in different slot positions. The vertex 102 may be formed by a twist that radially offset the legs by the dimension of one pin in the radial direction. The pins 90 may be formed from a single piece of metal such as copper, aluminum, silver, or any other electrically conductive material. The first leg 98 is disposed in one of the slots 34 and the second leg 100 is disposed in another of the slots 34 that is spaced apart by a span of slots. The regular pins 90 may have a span equal to the number of slots per pole, which is six slots in the illustrated embodiment. Thus, if the first leg 98 was in Slot 1, the second leg 100 would be in Slot 7. The first leg 98 includes a straight portion 99 disposed within a slot 34 and a first angled portion 104 that extends between the vertex 102 and the straight portion 99. The straight portion 99 and the angled portion 104 are joined at a first bend 106. The first leg 98 also includes a twist 110 that is angled outward at a second bend 108. The second leg 100 includes a straight portion 101 disposed within a slot 34 and a first angled portion 112 that extends between the vertex 102 and the straight portion 101. The first and second angled portions 104, 112 and the vertex by be collectively referred to as a crown. The straight portion 101 and the angled portion 112 are joined at a first bend 114. The second leg 100 also includes a twist 120 that is angled outward at a second bend 118. The twists 110, 120 angle in opposite directions to extend away from the pin 90 to connect with other pins of the path. In other types of pins, the twist may extend in the same direction. Most of the twists 110, 120 may have a span that is equal to the pin span divided by 2, which is three (6/2) in the illustrated embodiment. Thus, most of the pins 90 have a total span of twelve slots. The pins that attached to the terminals and neutral connected may have a slightly longer or shorter twists to facilitate the connection. Additionally, other the windings 40 include other types of pins that have longer twist to advance the slot positions of the winding path. This will be described in more detail below.

The regular pin 90 may be fabricated by first forming the vertex 102, the first angled portions 104, 112, and two extended straight portions. Then, the pin 90 is installed into the stator 22 by inserting the extended straight portions into the slots 34 of the stator 22. The second bends 108, 118 and the twists 110, 120 are formed after the pin 90 is installed through the slots by bending the extended legs as desired.

Figure 5:
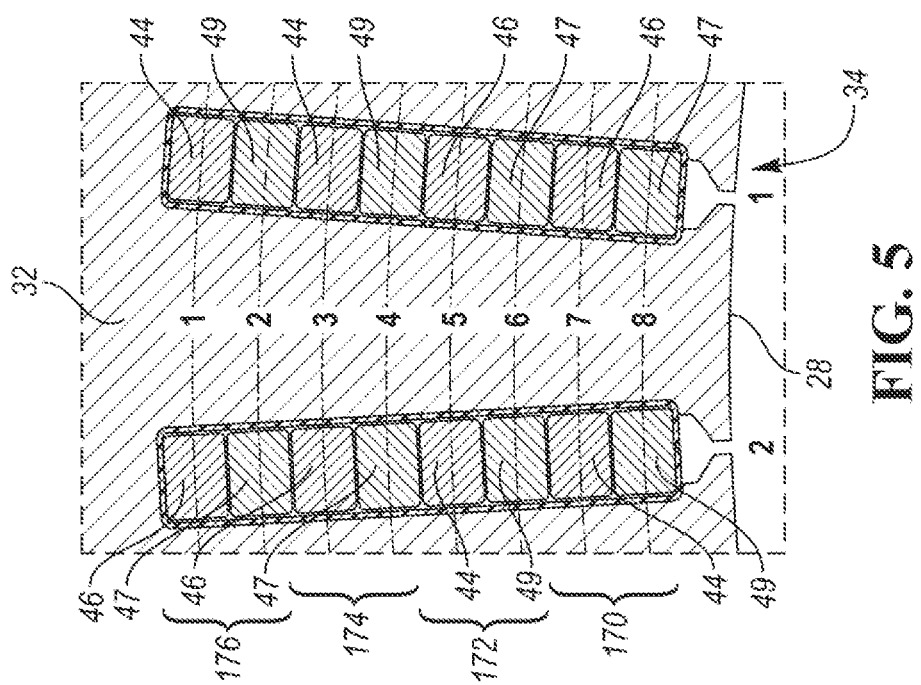
FIG. 5 is a magnified view of portion of FIG. 4.
Figure 4:
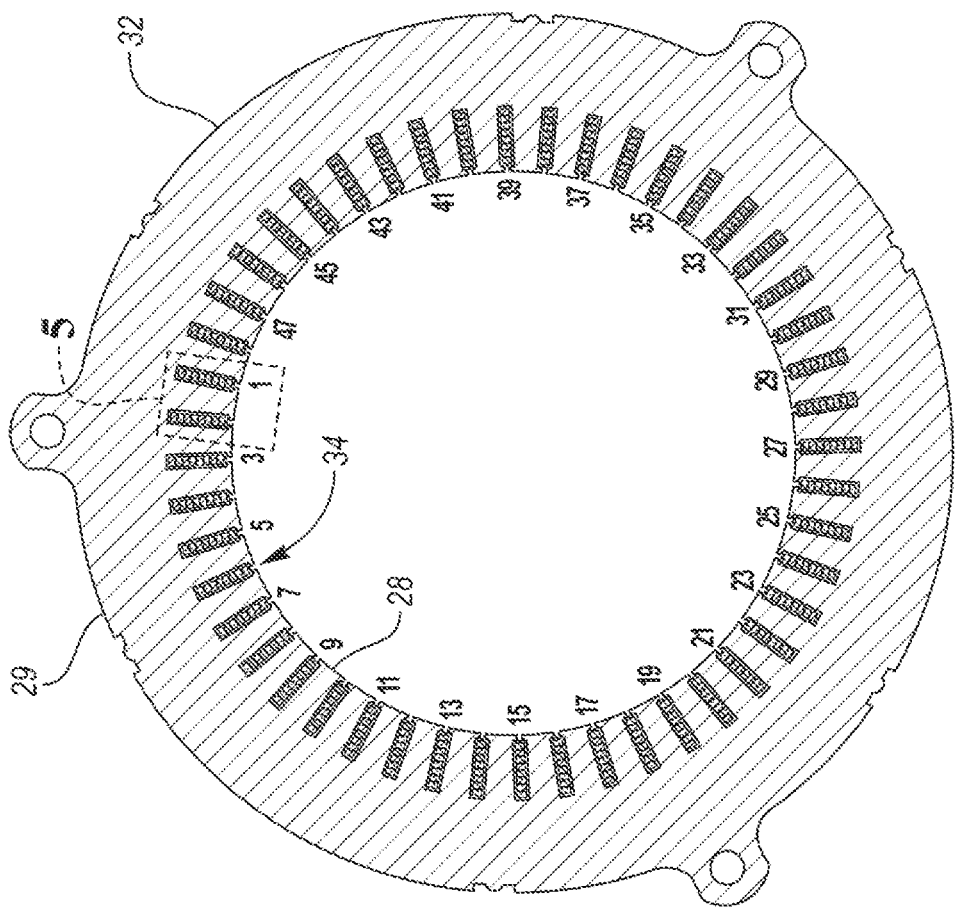
FIG. 4 is a cross-sectional end view of a stator of the electric machine.

Referring to FIGS. 4 and 5, the slots 34 are arranged 1 through 48 in the counterclockwise direction with the odd number slots being labeled for convenience. The slots 34 may include an inner radial layer of pins 170, an inner middle radial layer of pins 172, an outer middle radial layer of pins 174, and an outer radial layer of pins 176. Each of the layers may include at least two radial positions that are adjacent to each other. In the illustrated embodiment, each slot 34 has eight sequential positions in a one-by-eight linear arrangement, however, other arrangements are contemplated. The first position is nearest the OD 29 of the stator core 32 and the eighth position is nearest the ID 28 of the stator core 32. The inner layer 170 includes the seventh and eighth positions; the middle layer 172 includes the fifth and sixth positions; and the middle layer 174 includes the third and fourth positions, and the outer layer 176 includes the first and second positions.

Each of the slots 34 may only contain a single phase, e.g., Slot 1 only contains the U phase. The phases are arranged in groups to occupy adjacent slots in each of the poles, e.g., Slots 1 and 2 contain the U phase and Slots 3 and 4 contain the V phase. Each slot may include a same number of hairpins for each path of the phase disposed in that slot, e.g., Slot 1, which contains the U phase, has two hairpins of path 44, two hairpins of path 46, two hairpins of path 47, and two hairpins of path 49.

Figure 6:
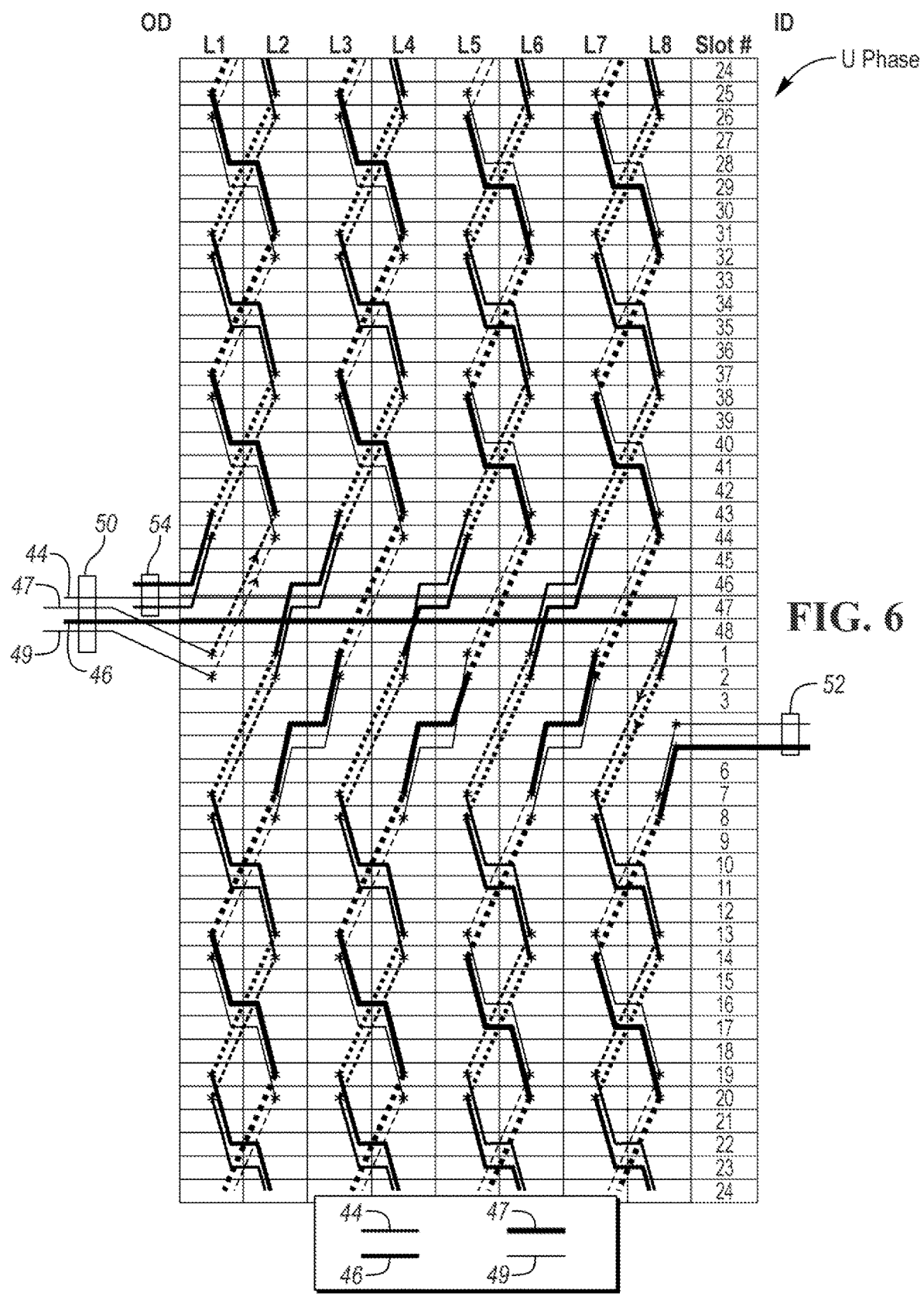
FIG. 6 is a winding diagram of a U phase of the windings looking from a weld side of the stator.
Figure 9:
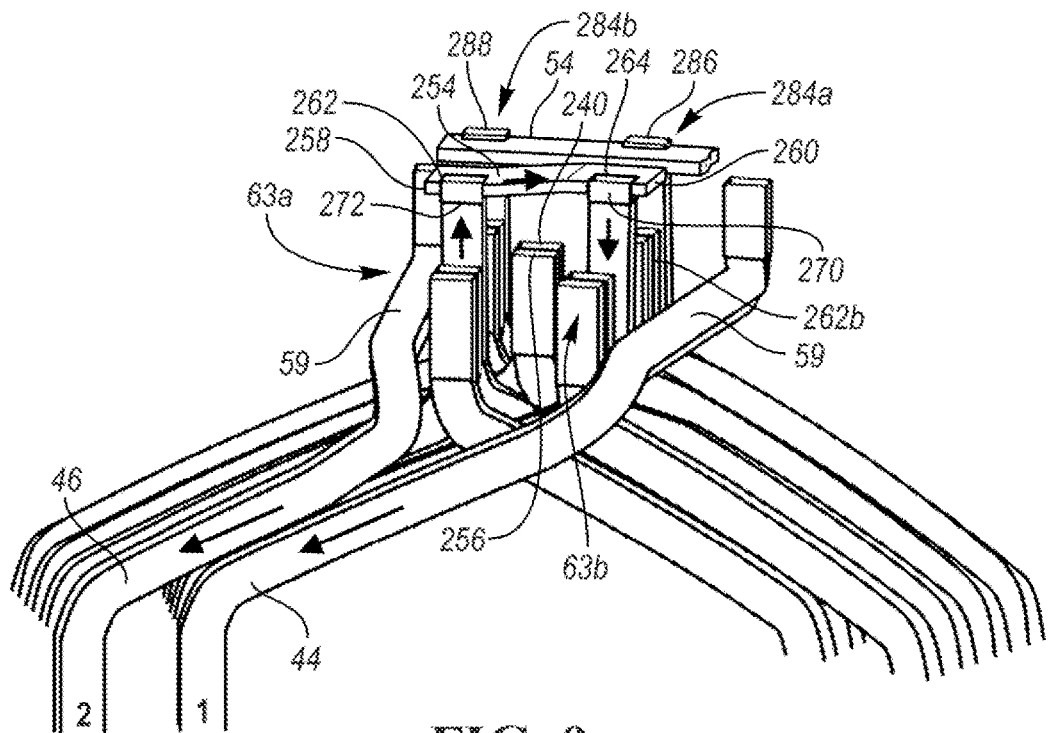
FIG. 9 is a perspective view of a portion of the first and second paths of the U phase with the stator core omitted for illustrative purposes.
Figure 10:
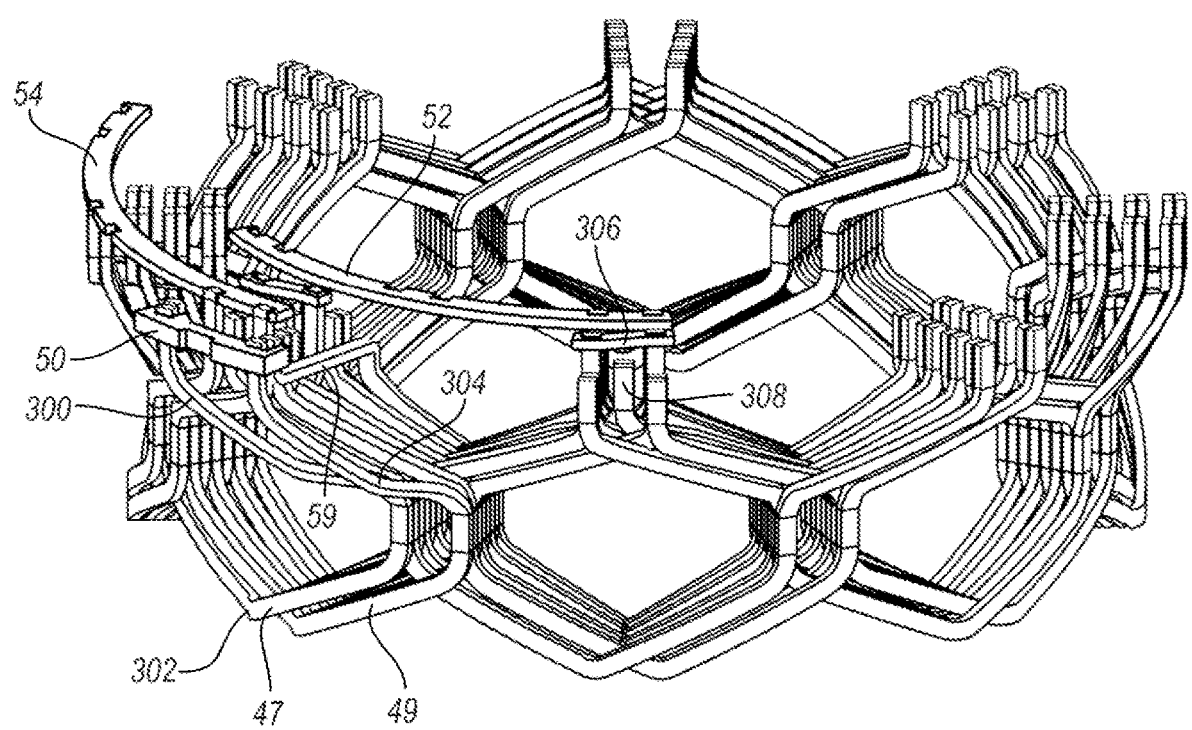
FIG. 10 is a diagrammatical perspective view of the U phase with the stator core omitted and the legs substantially shortened for illustrative purposes.
Figure 11:
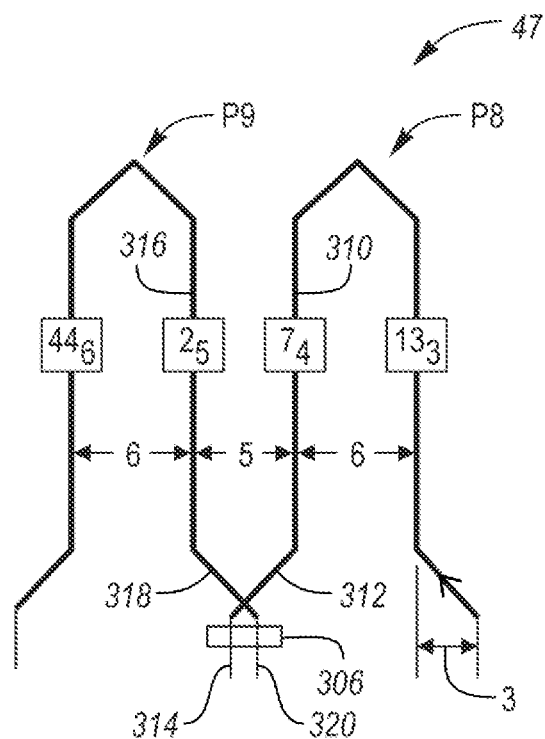
FIG. 11 is a diagrammatical view of select hairpins of a third path of the U phase.
Figure 12:
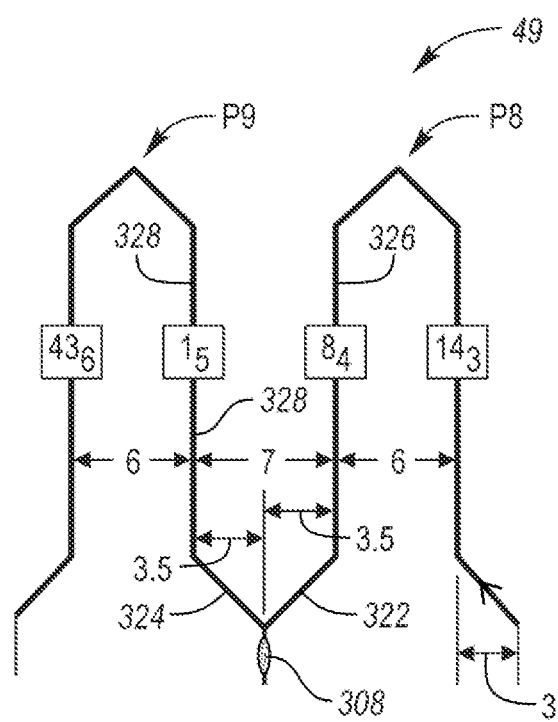
FIG. 12 is a diagrammatical view of select hairpins of a fourth path of the U phase.
Figure 13:
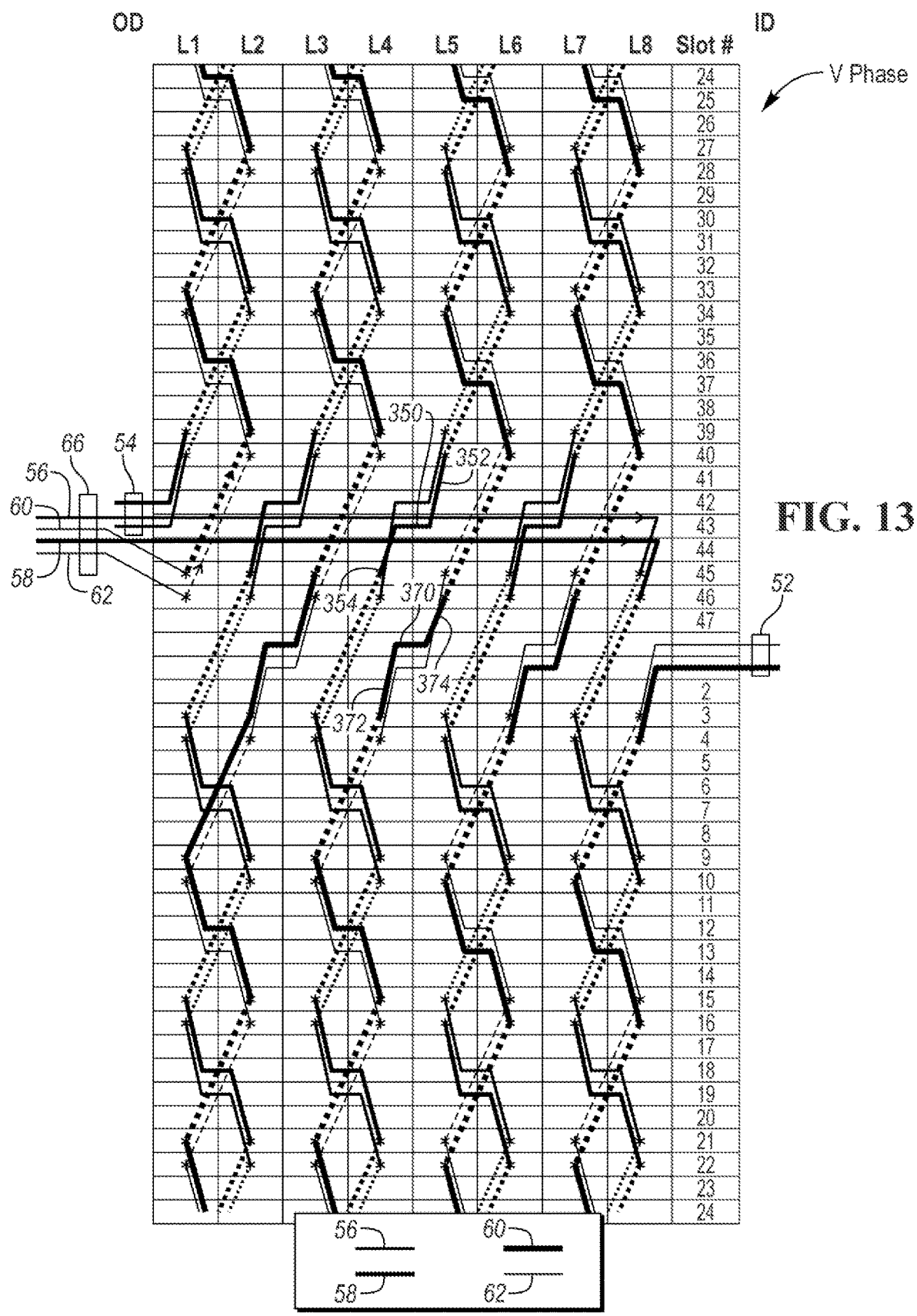
FIG. 13 is a winding diagram of a V phase of the windings looking from a weld side of the stator.

The U phase will now be described in more detail with reference to FIGS. 7, 8, and 9. The first path 44 begins with Pin 1 having a trailing leg 200 disposed in the eighth position of slot 1 and a leading leg 202 disposed in the seventh position of slot 7. The first path advances in the counterclockwise direction when view form the weld end 38, which is to the right in FIG. 7. The terms "leading leg" and "trailing leg" refer to the position of the legs relative to the direction of advancement of the path. The trailing leg 200 is connected to the terminal 50 by the terminal lead 59. Pin 2 has a trailing leg 204 disposed in the eighth position of Slot 13 and a leading leg 206 disposed in the seventh position of Slot 19. The twist 208 of Pin 1 is attached to the twist 210 of Pin 2 by a connection 212 near Slot 10. The connection may be a weld, such as a laser weld. Pin 3 has a trailing leg 214 disposed in the eighth position of Slot 25 and a leading leg 216 disposed in the seventh position of Slot 31. The twist 218 of Pin 2 is attached to the twist 220 of Pin 3 by a connection 222 near Slot 22. Pins 2 and 3 are regular pins that include a slots span of six between the leading and trailing legs and the twists have a span of three slots creating a span of six between Pins 2 and 3. The first path 44 continues from Pin 3 with regular pins 4, 5, 6, 7 that are interconnected with connections, e.g., welds, as described above. See FIG. 6 for details.

The path 44 includes 16 pins in the illustrated embodiment. Thus, Pins 1 through 8 form the first half of path 44 and Pins 9 through 16 form the second half of path 44. In the first half, the path 44 is behind the second path 46. If this were maintained throughout the second half of the paths, the stator would unbalanced. To balance the stator, the path 44 is advanced and the second path 46 is retarded to place the path 44 ahead of the path 46 in the second half of the U phase of windings 40.

The first path 44 may be advanced by using a pair of special pins (Pins 8 and 9) that include longer twists to advance the path 44 by 1 slot between pins 8 and 9. The special pins 8 and 9 have the same slot span as the regular pins, i.e., the legs of pins 8 and 9 are spaced by six slots. The one slot advancement is accomplished by forming 3½ pitch twists on the leading leg of Pin 8 and on the trailing leg of Pin 9. For example, Pin 8 includes a trailing leg 224 disposed in the sixth position of slot 37 and a leading leg 226 disposed in the fifth position of slot 43. The twist 228 of the trailing leg 224 is similar to the twists of the regular pins to space the trailing leg 224 of Pin 8 from the leading leg 230 of Pin 7 by 6 slots. Pin 9 includes a trailing leg 232 disposed in the fourth position of slot 2 and a leading leg 234 disposed in the third position of slot 8. The twist 236 of Pin 8 and the twists 238 of Pin 9 are elongated by half a slot, compared to the regular pins, to space the leading leg 226 from the trailing leg 232 by 7 slots. The elongated twists 236 and 238 may be connected by a weld 240 that is circumferentially offset by half a slot compared to the welds of the regular pins. This is shown in FIG. 9 where the weld 240 is disposed between the weld rows 63a and 63b.

The second path 46 begins with Pin 1 having a trailing leg 250 disposed in the eighth position of slot 2 and a leading leg 252 disposed in the seventh position of slot 8. The second path 46 also advances in the counterclockwise direction when viewed form the weld end 38. The trailing leg 250 is connected to the terminal 50 by the terminal lead 59.

The path 46 also includes 16 pins in the illustrated embodiment. Thus, pins 1 through 8 form the first half of path 46 and pins 9 through 16 form the second half of path 46. In order to balance the paths, the path 46 includes a reverse jumper 254 that retards advancement of the path 46 by one slot so that the first path 44 is ahead of the second path 46 for the second half of the windings. Unlike the first path 44 that used special pins 8 and 9 to advance the slot locations of the path, pins 8 and 9 of path 46 are regular pins that include a slots span of six between the trailing and leading legs and a slot span of 3 for the twists.

Pin 8 of path 46 has a trailing leg 256 disposed in the sixth position of slot 38 and a leading leg 258 disposed in the sixth position of slot 44. Pin 9, rather than being placed six slots ahead of Pin 8 is shifted back by one slot to have the trailing leg 260 disposed in the fourth position of slot 1 and the leading leg 262 disposed in the third position of slot 7. Thus, the leading leg 258 is only spaced apart from the trailing leg 260 by 5 slots instead of the regular six. Since the twists 264 and 266 have not been modified they crisscross as shown at 268. This crisscross places the weld segment 270 of the twist 266 behind the weld segment 272 of the twist 264. The weld segments 270 and 272 are roughly spaced by one slot. To connect these ends, the reverse jumper 254 is used.

The reverse jumper 254 includes a body 256 such as a strip of metal or other electrically conductive material. The body 256 includes a leading end 258 and a trailing end 260. A first opening 262 is formed near the leading end 258 and receives the weld segment 272 of Pin 8. The weld segment 272 may be welded to the jumper 254. A second opening 264 is formed near the trailing end 260 and receives the weld segment 270 of Pin 9. The weld segment 270 may be welded to the jumper 254. The weld segments 270 and 272 may be lengthened to extend axially further than the ends of the regular twists so that the weld segments 270 and 272 are axially further from the stator end face 38. This provides clearance for connecting the reverse jumper 254 over top of other weld segments such as the weld 240 between Pins 8 and 9 of the first path 44.

The advancement created by pins 8 and 9 of the first path 44 cooperate with the retard of pins 8 and 9 of the second path 46 to move the first path ahead of the second path 46. This switches the first path 44 from being in odd numbered slots to being in even numbered slots. Similarly, the second path 46 switches from being in even numbered slots to being in odd numbered slots. Switching the placements of the first path 44 relative to the second path 46 at the halfway point balances the stator.

The leading leg 234 of Pin 9 includes a twist 280 having a slot span of three. The twist 280 is connected to Pin 10 which is interconnected to a series of additional pins to finish the path 44 as shown in the winding diagram of FIG. 6. The last pin of the path 44 (Pin 16') connects to the outer neutral connection 54. The leading leg 262 of Pin 9 of path 46 includes a twist 282 having a span of three slots. The twists 282 is connected to Pin 10 which is interconnected to a series of additional pins to finish the path 46 as shown in the winding diagram of FIG. 6. The last pin of path 46 (Pin 16") connects to the outer neutral connection 54.

The neutral connection 54 may include a body such as a strip of conductive metal or other material. The body defines openings that connect with hairpins. In the illustrated embodiment, the neutral connection 54 defines six openings 284. The openings may be grouped in pairs of two such as openings 284a and 284b. Each of the groupings are associated with one of the phases. The U phase is associated with the openings 284a and 284b. Pin 16' has a weld portion 286 received in opening 284a, and Pin 16" of the second path 46 has a weld portion 288 received in opening 284b. The weld portions 284 and 286 may be lengthened to provide clearance for the neutral connection 54 to be attached to the weld portions 286, 288 above other portions of the windings 40 similar to the reverse jumper 254.

Referring to FIGS. 6, 10, 11 and 12 the third and fourth paths 47 and 49 of the U phase begin at the OD 29 of the stator at terminal 50 and wind in the clockwise direction. The third path 47 begins at Pin 1 having a trailing leg disposed in the first position of slot 1 and a leading leg disposed in the second position of slot 43. In order to connect to the terminal 50, the trailing leg of Pin 1 includes a counter twist 300 that extends in the counterclockwise direction towards the vortex 302. The leading leg of Pin 1 includes a regular twist that extends clockwise away from the vertex 302. The fourth path 49 also includes a counter twist 304 to connect Pin 1 with the terminal 50.

Similar to the first and second paths 44 and 46, the third and fourth paths 47 and 49 are located in adjacent slots. The path 47 begins at slot 1 and continues in odd numbered slots until the midway point, and the path 49 begins at slot 2 and continues in even-numbered slots until the midway point. Similar to the paths 44 and 46, the paths 47 and 49 include special pins or a reverse jumper to advance path 49 to the odd-number slots and to retard path 47 to the even-numbered slots to balance the stator.

Path 47 includes a reverse jumper 306 that attaches between Pins 8 and 9. Pins 8 and 9 and the jumper 306 may be similar to path 46. For example, the leading leg 310 of Pin 8 may be disposed in the fourth position of slot 7 and includes a twist having a slots span of three which places the weld portion 314 near slot 4. The trailing leg 316 of Pin 9 is disposed in the fifth position of slot 2 and includes a twist 318 that has a slots span of three placing the weld portion 320 near slot 5. Pin 9 is spaced five slots away from Pin 8 causing the twist 312 and 318 to crisscross. The reverse jumper 306 connects between the weld portions 314 and 320 to electrically connect pins 8 and 9. The jumper 306 may be similar or the same as the above described jumper 254.

Path 49, like path 44, includes elongated twists 322, 324 at pins 8 and 9 to create a slot span of seven between the leading leg 326 of Pin 8 and the trailing leg 328 of Pin 9. Pins 8 and 9 are interconnected by a weld 308 that is circumferentially offset from the normal weld rows and is disposed under the reverse jumper 306 similar to paths 44 and 46.

Paths 47 and 49 continue to weave around the stator toward the inner diameter with the last leg of path 47 being in slot 7 and the last leg of path 49 being in slot 8. The path 47 terminates near slot 5 and the path 49 terminates near slot 4. The weld portion 330 of the path 47 and the weld portion 332 of path 49 are connected to the inner neutral connection 54. The inner neutral connection 54 may have a structure that is the same or similar to the neutral connection 52.

Figure 14:
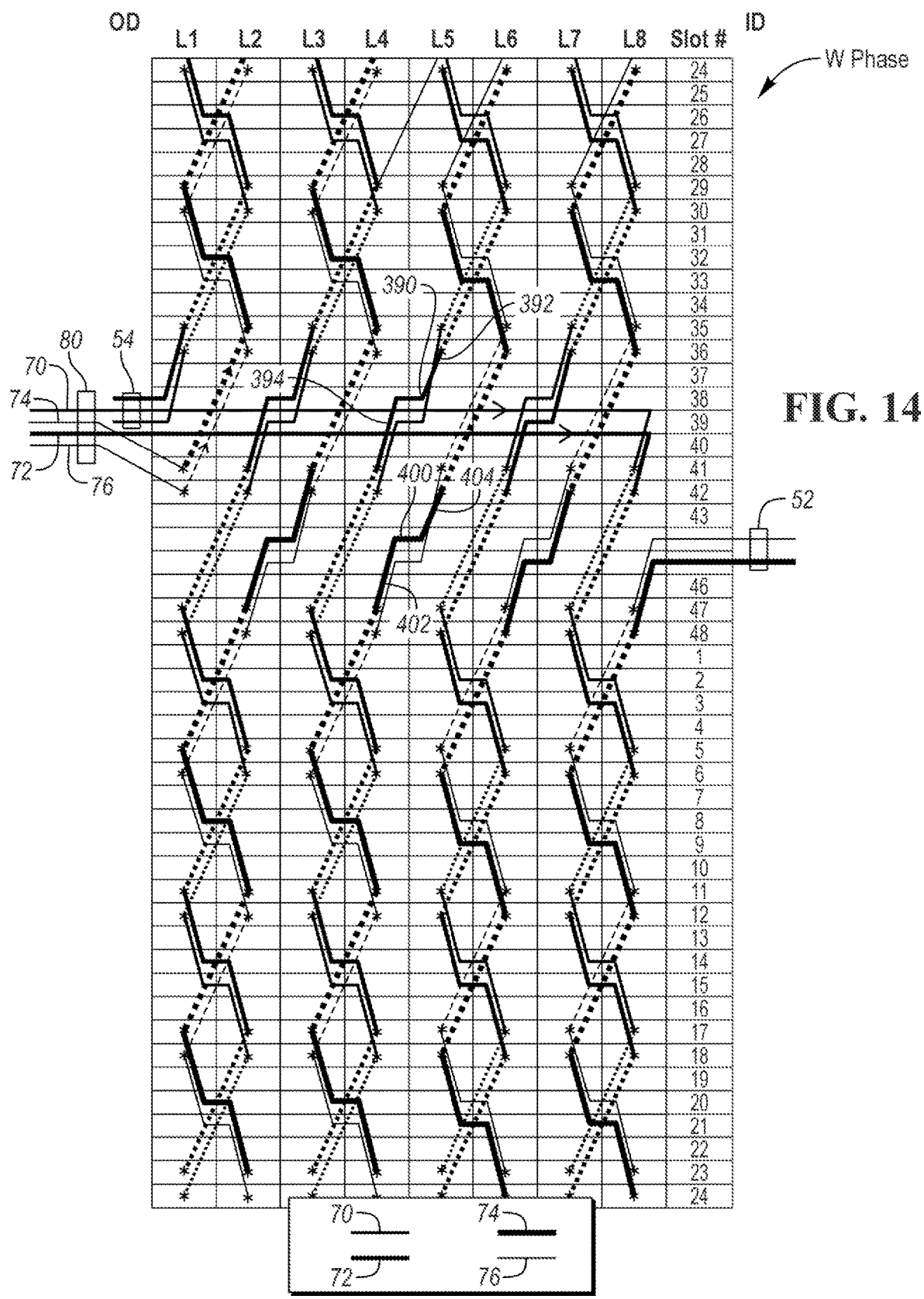
FIG. 14 is a winding diagram of a W phase of the windings looking from a weld side of the stator.

The V and W phases of the windings 40 may be the same as the U phase but shifted to different slots. Referring to FIGS. 2 and 14, the first and second paths 56 and 58 of the V phase are shifted over four slots in the clockwise direction to have Pin 1 of path 56 disposed in slots 45 and 3 and to have Pin 1 of path 58 disposed in slots 46 and 4. The first and second paths 56 and 58 wind in the counterclockwise direction. The first path 56 begins in the odd numbered slots and advances to the even number slots midway through the path by having extended twists on pins 8 and 9 to create a slot span of seven slots between pins 8 and 9. This may be the same as pins 8 and 9 of the first path 44 and for brevity this connection will not be explained again. The second path 58 begins in even-numbered slots and retards to the odd-numbered slots midway through the path using a reverse jumper 350 (see FIG. 2). The reverse jumper 350 connects the twist 352 of Pin 8 to the twist 354 of Pin 9. The reverse jumper connection 350 may be the same as the path 46 of the U phase and will not be explained again for brevity. The first and second paths 56 and 58 end at the outboard neutral connection 54 and connect to the middle grouping 354 of openings.

The third and fourth paths 60 and 62 are shifted over four slots in the clockwise direction to have Pin 1 of path 60 disposed in slots 45 and 39 and to have Pin 1 of path 62 disposed in slots 46 and 40. The third and fourth paths 60 and 62 wind in the counterclockwise direction. The third path 60 begins in the odd-numbered slots and advances to the even-number slots midway through the path by having extended twists on pins 8 and 9 to create a slot span of seven slots between pins 8 and 9. This may be the same as pins 8 and 9 of the first path 44 and for brevity this connection will not be explained again. The fourth path 62 begins in even-numbered slots and retards to the odd-numbered slots midway through the path using a reverse jumper 370 (see FIG. 2). The reverse jumper 370 connects the twist 372 of Pin 8 to the twist 374 of Pin 9. The reverse jumper connection 370 may be the same as the path 46 of the U phase and will not be explained again for brevity. The third and fourth paths 60 and 62 end at the inboard neutral connection 52 and connect to the middle grouping 376 of openings. Please see the winding diagram of FIG. 14 for further details regarding the V phase.

Referring to FIGS. 2 and 14, the first and second paths 70 and 72 of the W phase are shifted over eight slots, relative to the U phase, in the clockwise direction to have Pin 1 of path 70 disposed in slots 41 and 47 and to have Pin 1 of path 72 disposed in slots 42 and 48. The first and second paths 70 and 72 wind in the counterclockwise direction. The first path 70 begins in the odd-numbered slots and advances to the even-number slots midway through the path by having extended twists on pins 8 and 9 to create a slot span of seven slots between pins 8 and 9. This may be the same as pins 8 and 9 of the first path 44 and for brevity this connection will not be explained again. The second path 72 begins in even-numbered slots and retards to the odd-numbered slots midway through the path using a reverse jumper 390. The reverse jumper 390 connects the twist 392 of Pin 8 to the twist 394 of Pin 9. The reverse jumper connection 390 may be the same as the path 46 of the U phase and will not be explained again for brevity. The first and second paths 70 and 72 end at the outboard neutral connection 54 and connect to the grouping 396 of openings.

The third and fourth paths 74 and 76 are shifted over eight slots in the clockwise direction to have Pin 1 of path 74 disposed in slots 41 and 35 and to have Pin 1 of path 76 disposed in slots 42 and 36. The third and fourth paths 74 and 76 wind in the counterclockwise direction. The third path 74 begins in the odd-numbered slots and advances to the even-number slots midway through the path by having extended twists on pins 8 and 9 to create a slot span of seven slots between pins 8 and 9. This may be the same as pins 8 and 9 of the first path 44 and for brevity this connection will not be explained again. The fourth path 76 begins in even-numbered slots and retards to the odd-numbered slots midway through the path using a reverse jumper 400. The reverse jumper 400 connects the twist 402 of Pin 8 to the twist 404 of Pin 9. The reverse jumper 400 may be the same as the path 46 of the U phase and will not be explained again for brevity. The third and fourth paths 74 and 76 end at the inboard neutral connection 52 and connect to the grouping 406 of openings. Please see the winding diagram of FIG. 14 for further details regarding the W phase.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An electric machine comprising:
    a stator core defining slots;
    a hairpin winding path including first and second hairpins having legs with same slot spans and twist with same slot spans, wherein the hairpins are installed in the core such that one of the twists of the first hairpin crisscrosses with one of the twists of the second hairpin, and wherein the slot span between the first and second hairpins is less than the slot spans of the legs by one slot; and
    a reverse jumper joining the twists that crisscross.

2. The electric machine of claim 1, wherein the slot spans of the twists are half of the slot spans of the legs.

3. The electric machine of claim 1, wherein the slot spans of the legs are six and the slot spans of the twists are three.

4. The electric machine of claim 1, wherein the reverse jumper includes a body defining first and second openings that receive the twists that crisscross, wherein the first and second openings are spaced apart by a span of one slot.

5. The electric machine of claim 1, wherein the winding path further includes third and fourth hairpins having legs with same slot spans as the first and second hairpins and twist with same slot spans as the first and second hairpins, wherein the third and fourth hairpins are installed in the core such that the twists of the third and fourth hairpins do not crisscross.

6. The electric machine of claim 5, wherein one of the twists of the third hairpin is joined to the other of the twists of the second hairpin at a connection.

7. The electric machine of claim 6, wherein the stator core defines and end face, and wherein an axial distance between the end face and the reverse jumper is greater than an axial distance between the end face and the connection.

8. An electric machine comprising:
    a stator core defining circumferentially arranged slots;
    a first hairpin winding path of a first phase of the electric machine including first and second hairpins each having a leading leg and a trailing leg that are spaced apart by a slot span of X, wherein each of the legs are outwardly bent to have a twist with a slot span of X divided by two, wherein the first and second hairpins are installed in corresponding ones of the slots such that a slot span between the leading leg of the first hairpin and the trailing leg of the second hairpin is equal to X minus one and the twist of the leading leg of the first hairpin and the twist of the trailing leg of the second hairpin crisscross; and
    a reverse jumper joining the twist of the leading leg of the first hairpin to the twist of the trailing leg of the second hairpin.

9. The electric machine of claim 8, wherein X is six.

10. The electric machine of claim 8, wherein the reverse jumper includes a body defining first and second openings that receive the twist of the leading leg of the first hairpin and the twist of the trailing leg of the second hairpin, respectively, wherein the first and second openings are spaced apart by a slot span of one.

11. The electric machine of claim 8 further comprising:
    a second hairpin winding path of the first phase including third and fourth hairpins each having a leading leg and a trailing leg that are spaced apart by a slot span of X, wherein the leading leg of the third hairpin and the trailing leg of the fourth hairpin are bent to have a twist with a slot span of X plus one divided by two, wherein the third and fourth hairpins are installed in corresponding ones of the slots such that a slot span between the leading leg of the third hairpin and the trailing leg of the fourth hairpin is X plus 1 to locate the twist of the leading leg of the third hairpin adjacent to the twist of the trailing leg of the fourth hairpin; and
    a connection joining the twist of the leading leg of the third hairpin to the twist of the trailing leg of the fourth hairpin.

12. The electric machine of claim 11, wherein the leading leg of the first hairpin and the leading leg of the third hairpin are in adjacent ones of the slots.

13. The electric machine of claim 11 further comprising:
    a third hairpin winding path of the first phase including fifth and six hairpins each having a leading leg and a trailing leg that are spaced apart by a slot span of X, wherein each of the legs of the fifth and sixth hairpins are bent to have a twist with a slot span of X divided by two, wherein the fifth and sixth hairpins are installed in corresponding ones of the slots such that a slot span between the leading leg of the fifth hairpin and the trailing leg of the sixth hairpin is equal to X minus one and the twist of the leading leg of the fifth hairpin and the twist of the trailing leg of the sixth hairpin crisscross;
    a second reverse jumper joining the twist of the leading leg of the fifth hairpin to the twist of the trailing leg of the sixth hairpin;
    a fourth hairpin winding path of the first phase including seventh and eighth hairpins each having a leading leg and a trailing leg that are spaced apart by a slot span of X, wherein the leading leg of the seventh hairpin and the trailing leg of the eight hairpin are bent to have a twist with a slot span of X plus one divided by two, wherein the seventh and eighth hairpins are installed in corresponding ones of the slots such that a slot span between the leading leg of the seventh hairpin and the trailing leg of the eighth hairpin is X plus 1 to locate the twist of the leading leg of the seventh hairpin adjacent to the twist of the trailing leg of the eighth hairpin; and
    another connection joining the twist of the leading leg of the seventh hairpin to the twist of the trailing leg of the eighth hairpin.

14. The electric machine of claim 13 further comprising:
    a terminal joined to the first, second, third, and fourth paths;

a first neutral connection joined to the first and second paths; and a second neutral connection joined to third and fourth paths.

15. The electric machine of claim 14, wherein the first neutral connection is located near an outer diameter of the stator core and the second neutral connection is located near an inner diameter of the stator core.

16. An electric machine comprising:

a stator core defining slots;

a hairpin winding path including a first section of interconnected first hairpins having legs disposed in even ones of the slots and a second section of interconnected second hairpins having legs disposed in odd ones of the slots, wherein the legs of each of the first hairpins are spaced apart by a slot span of X and the legs of each of the second hairpin are spaced apart by a slot span of X and wherein a leading one of the legs of the last hairpin is spaced apart from a trailing one of the legs of the initial hairpin by a slot span of X minus one; and a reverse jumper joining a last one of the first hairpins to an initial one of the second hairpins, the jumper defining a leading end connected to the last one of the first hairpins and a trailing end connected to the initial one of the second hairpins.

* * * * *